(12) United States Patent
Broyles

(10) Patent No.: US 6,732,219 B1
(45) Date of Patent: May 4, 2004

(54) DYNAMIC ALLOCATION OF DEVICES TO HOST CONTROLLERS

(75) Inventor: Paul James Broyles, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 499 days.

(21) Appl. No.: 09/791,288

(22) Filed: Feb. 23, 2001

(51) Int. Cl.[7] ............ G06F 13/00; H04L 12/66; H04L 12/42
(52) U.S. Cl. ............ 710/316; 710/317; 370/352; 370/449
(58) Field of Search ............... 710/316, 317, 710/33; 370/449, 352, 364, 389

(56) References Cited

U.S. PATENT DOCUMENTS

| | | | | |
|---|---|---|---|---|
| 5,519,695 A | * | 5/1996 | Purohit et al. ............ | 370/352 |
| 5,761,200 A | * | 6/1998 | Hsieh ............ | 370/364 |
| 6,141,351 A | * | 10/2000 | Goodnow et al. ............ | 370/449 |
| 6,288,645 B1 | * | 9/2001 | McCall et al. ............ | 340/568.2 |
| 6,314,096 B1 | * | 11/2001 | Tanabe et al. ............ | 370/389 |
| 6,370,605 B1 | * | 4/2002 | Chong, Jr. ............ | 710/33 |

OTHER PUBLICATIONS

"Stuctured Computer Organization", by Andrew S. Tanenbaum, pp. 11–13, 3rd edition 1976.*

* cited by examiner

Primary Examiner—Tim Vo

(57) ABSTRACT

The present technique is associated with a device-controller configuration system for a computer system having a plurality of controllers. The technique utilizes an automatic switching assembly so that each device is routed to one of the controllers based on a data transfer specification of the device and data transfer capacities of the controllers. Accordingly, the technique evaluates at least one of a plurality of hypothetical configurations to determine a viable and/or optimal configuration.

49 Claims, 4 Drawing Sheets

DYNAMIC ALLOCATION OF DEVICES TO HOST CONTROLLERS

FIELD OF THE INVENTION

The present technique relates generally to the field of computer systems, and more specifically, to control systems for the computer systems. The present technique is a system and method for routing devices to controllers based on data transfer capacities of the controllers and data transfer specifications of the devices.

BACKGROUND OF THE INVENTION

Computer systems (e.g., desktops, laptops, servers, workstations, PDAs, etc.) generally comprise a plurality of components, such as memory, a display, a modem, a processor and/or a controller unit, which are integrated for a particular application. The components communicate through a bus, or collection of conductors, which comprises an address bus for identifying the components and a data bus for transferring data between the components. Moreover, computer systems often have multiple bus types, such as a local bus and an expansion bus (e.g., for add on components), each having an address and data bus. Computer systems also comprise many different bus architectures, such as ISA/AT (Industry Standard Architecture), EISA (Extended ISA), PCI (Peripheral Component Interconnect), VESA, and USB (Universal Serial Bus), which may have substantially different data transfer characteristics (e.g., clock speed and data bandwidth). Clock speed refers to the speed at which data is transferred, while data bandwidth refers to the amount of data that is transferred per transmittal. A local bus (e.g., PCI) connects almost directly to the processor, providing very fast throughput versus an expansion bus (e.g., AT). For example, an AT bus may run at 8 megahertz with a 16-bit bandwidth, while a PCI bus may operate at 33 or 66 megahertz with a 64-bit bandwidth.

Controllers utilize the buses and control the transfer of data among components of the computer system. For many devices, the local bus is desirable to ensure sufficient data transfer speed and bandwidth. Unfortunately, the components often outnumber the available controllers due to various cost restraints, space limitations, and other considerations. For example, an ASIC chipset (Application Specific Integrated Circuit) often has 2 host controllers for 4 or 6 ports and/or devices.

As mentioned above, the buses and controllers have limited data transfer capacities (i.e., speeds and bandwidths), which may depend on the particular architecture of the computer system. In contrast, devices have widely varying data transfer requirements, which may be substantially more demanding for some devices. For example, devices such as digital cameras and DVD-ROM drives typically require greater bandwidth than devices such as keyboards or pointer devices. A camera may require 70–80% of the available bandwidth, whereas a keyboard or mouse may require only 5–10% bandwidth. If two cameras are connected to a single controller, there may be a bottleneck if the controller does not have enough bandwidth for both of the cameras. Accordingly, the bottleneck may cause system or device failures, conflicts and/or other performance problems.

Currently, bandwidth utilization is maximized by intelligently attaching devices to the controllers. In many computer systems, the controllers are hardwired to a predetermined number of devices or ports (internal or external), preventing any reconfiguration other than by rearranging the devices. Accordingly, configuring the devices and components requires uncommon knowledge of board/chip design and device requirements, as well as time for the configuration. As computer technology continues to advance, computer systems are often upgraded by adding or replacing components. For example, a DVD-ROM drive or a digital camera may be added to an existing computer system. Unfortunately, a consumer generally lacks the computer expertise (e.g., system configurations, controller specifications, or device requirements) necessary to properly configure the devices to ensure sufficient data transfer rates for each of the devices. The typical consumer would tend to connect a newly purchased device to the first available port. Although this configuration may operate, it can cause device conflicts and/or performance problems if the connection results in insufficient bandwidth for one or more of the devices coupled to the port.

One solution would be to add more host controllers, or a dedicated controller for high speed devices. However, adding controllers results in higher costs for the computer system. As consumers continue to demand lower priced computer systems, it is desirable to keep the number of components and costs to a minimum. Furthermore, additional host controllers would not completely solve the problem, because each of the host controllers still has a limited amount of bandwidth for multiple devices.

Accordingly, there is a need for an improved technique for routing devices to host controllers to ensure that each device receives sufficient bandwidth and that each controller is not overloaded beyond its available bandwidth. It would be advantageous to provide a technique that would detect the bandwidth requirements for the devices, compare the bandwidth requirements with the available bandwidths from each of the controllers, and then distribute the devices to the controllers such that each device receives a desired bandwidth.

SUMMARY OF THE INVENTION

The present technique is associated with a device-controller configuration system for a computer system having a plurality of controllers. The technique utilizes an automatic switching assembly to ensure that each device is routed to one of the controllers based on a data transfer specification of the device and data transfer capacities of the controllers. Accordingly, the technique evaluates at least one of a plurality of hypothetical configurations to determine a viable and/or optimal configuration.

According to one aspect of the present technique, a system may be provided for routing a device to a controller for a computer. The system may comprise a switchable routing assembly configured for automatically routing each of a plurality of the devices to one of a plurality of the controllers, wherein the switchable routing assembly is configured to distribute available data transfer capabilities for each of the plurality of controllers to the plurality of devices based on a desired data transfer statistic for each of the plurality of devices.

According to another aspect of the present technique, a method may be provided for automatically configuring a plurality of devices with a plurality of controllers for a computer system. The method may comprise obtaining a plurality of data transfer specifications for the plurality of devices, determining a plurality of hypothetical configurations having each device coupled to one of the plurality of controllers, and comparing the plurality of data transfer specifications with data transfer capacities of each of the plurality of controllers for at least one of the hypothetical configurations. The technique also may comprise selecting a viable configuration from the plurality of hypothetical configurations based on the comparison of data transfer specifications and data transfer capacities. Accordingly, each device may be automatically routed to one controller based on the selected viable configuration.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
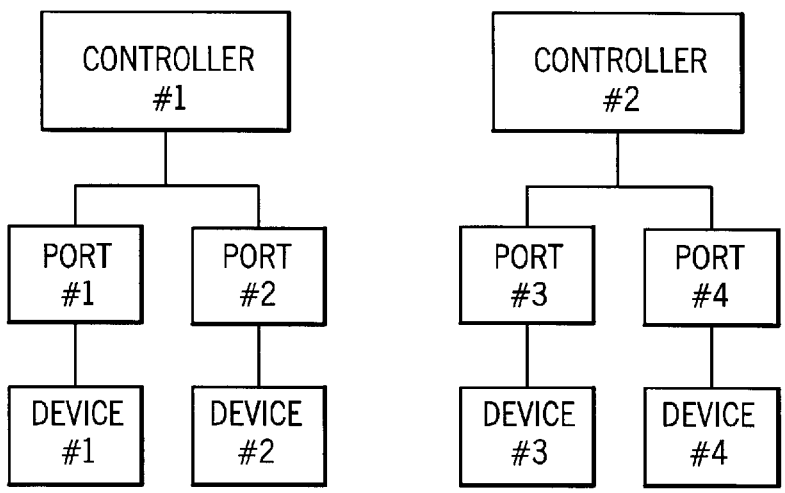
FIG. 1 is a diagram of a controller system having a series of controllers with multiple ports and devices coupled to the ports.

The present technique comprises a system for routing a plurality of devices to one or more controller units based on data transfer characteristics of both the devices and the controllers. FIG. 1 illustrates an example of an existing controller system 10A configured for a computer system or other electronic device, wherein the controller system 10A has controllers #1 and #2, ports #1 through #4, and devices #1 through #4. As illustrated, a plurality of ports are wired to each of the controllers #1 and #2, and a device is wired to each of ports #1 through #4. For example, devices #1 and #2 are wired to ports #1 and #2, respectively, which are then wired to the controller #1. Similarly, devices #3 and #4 are wired to ports #3 and #4, respectively, which are then wired to the controller #2. The wiring may be permanent, or removable to allow reconfiguration of the ports and/or devices, and may extend directly from the devices to the controllers rather than through a port as illustrated. Moreover, the ports may comprise a serial bus port, a parallel port, an infrared port, a universal serial bus (USB) port, and other ports for a variety of bus architectures (e.g, ISA, USB, PCI, etc.).

In this exemplary embodiment, the controllers #1 and #2 provide data transfer control for the devices #1–2 and #3–4, respectively, such as between a computer system and a device for the computer system (e.g., a disk drive, a display screen, a keyboard, a printer, a digital camera, etc.). Each of the controllers #1 and #2 has a data transfer capacity (e.g., an available bandwidth) for transferring data between the computer system and the device, while each of the devices #1 through #4 has a desired or required data transfer specification (e.g., a desired bandwidth) necessary for optimal operation of the device. For example, the devices #1 through #4 may require 50%, 20%, 12% and 70% of the available bandwidth, respectively, which would not cause a problem or conflict with the available bandwidth. However, the devices #1 through #4 may require 80%, 80%, 10% and 10%, respectively, which would cause a substantial overload of the available bandwidth for controller #1. To optimally operate in this controller system 10A, the devices #1 through #4 must be coupled to the appropriate controller to ensure that each of the devices receives a sufficient amount of the available bandwidth. Thus, in the second scenario, the devices #1 through #4 would need to be reconfigured, such as by coupling devices #1 and #3 to controller #1 and by coupling devices #2 and #4 to controller #2. This would load each of the controllers with 90% (e.g., 80% plus 10%) of the available bandwidth. Unfortunately, this reconfiguration process must be done manually for the controller system 10A of FIG. 1, and may be difficult where the data transfer capacities and specifications are unknown.

Figure 2:
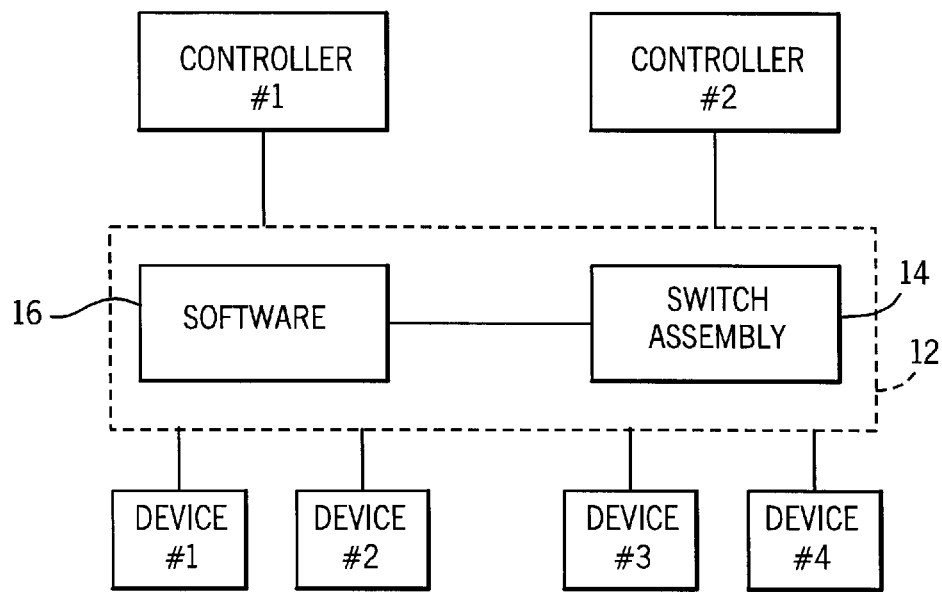
FIG. 2 is a diagram of the controller system having a device routing system for automatically routing each of the devices to one of the controllers.

FIG. 2 is a diagram of one exemplary controller system 10B according to the present invention. Controller system 10B may be deployed in an electronic device 11, such as a personal computer, server, workstation, PDA, etc. Controller system 10B has a device routing system 12 for automatically routing each of the devices #1 through #4 to one of the controllers #1 and #2 based on data transfer characteristics (e.g., bandwidths) of the controllers and devices. As illustrated, the device routing system 12 comprises a switch assembly 14 configured for switching each of the devices #1 through #4 between a connection with the controllers #1 and #2, such that a plurality of device-controller connections may be achieved by the switch assembly 14. The switch assembly 14 may comprise a switch register, wherein each logic switch connects the respective device to either the controller #1 or the controller #2. For example, the switch assembly may comprise an 8 bit switch register, such as $D_8D_7D_6D_5D_4D_3D_2D_1$ (binary), wherein $D_N$ refers to the device #N and the switch register connects the device #N to controller #1 for $D_N=0$ and to controller #2 for $D_N=1$, respectively. Moreover, the controller system 10B may comprise a program, or other software 16, for operating the switch assembly 14. For example, the software 16 may comprise software in ROM BIOS (Read Only Memory, Basic Input Output System), a device driver, and/or other system software. In this exemplary embodiment, the software 16 may be used to detect devices, to determine data transfer characteristics (e.g., bandwidth specifications) for the devices #1 through #4 and for the controllers #1 and #2, and to determine an acceptable and/or optimal configuration for connecting the devices to the controllers to ensure that each device receives sufficient bandwidth.

Figure 3:
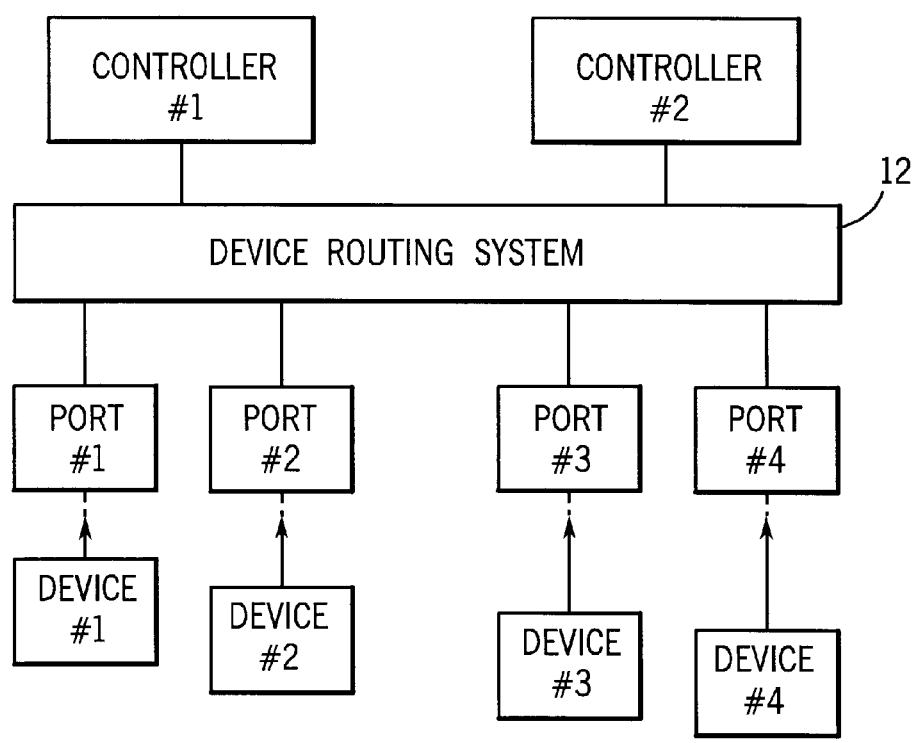
FIG. 3 is a diagram of the controller system illustrating devices being coupled to ports, which are coupled to the device routing system.

FIG. 3 is a diagram of the controller system 10B, wherein devices #1 through #4 are being coupled to ports #1 through #4, in sequence, and the device routing system 12 is disposed between the ports #1 through #4 and the controllers #1 and #2 for automatically configuring connections between the devices/ports and controllers to ensure adequate bandwidth for each of the devices. Note that the device routing system 12 may be intiated as each of the devices are sequentially connected to the respective ports, or alternatively, the device routing system 12 may be initiated after all of the desired devices #1 through #4 have been connected to the ports #1 through #4, respectively. Moreover, the device routing system 12 may be disposed internal to or external to a computer system or electronic device, and may comprise a variety of port and device arrangements (e.g., internal, external, direct wiring, etc.). For example, a hard drive may be wired directly to the device routing system 12 or to one of the controllers, while an external port may be provided for coupling a peripheral device such as a digital camera. Furthermore, the bus architecture may comprise a USB bus, a PCI bus, an ISA bus, and a variety of other local and/or external bus architectures.

Figure 4:
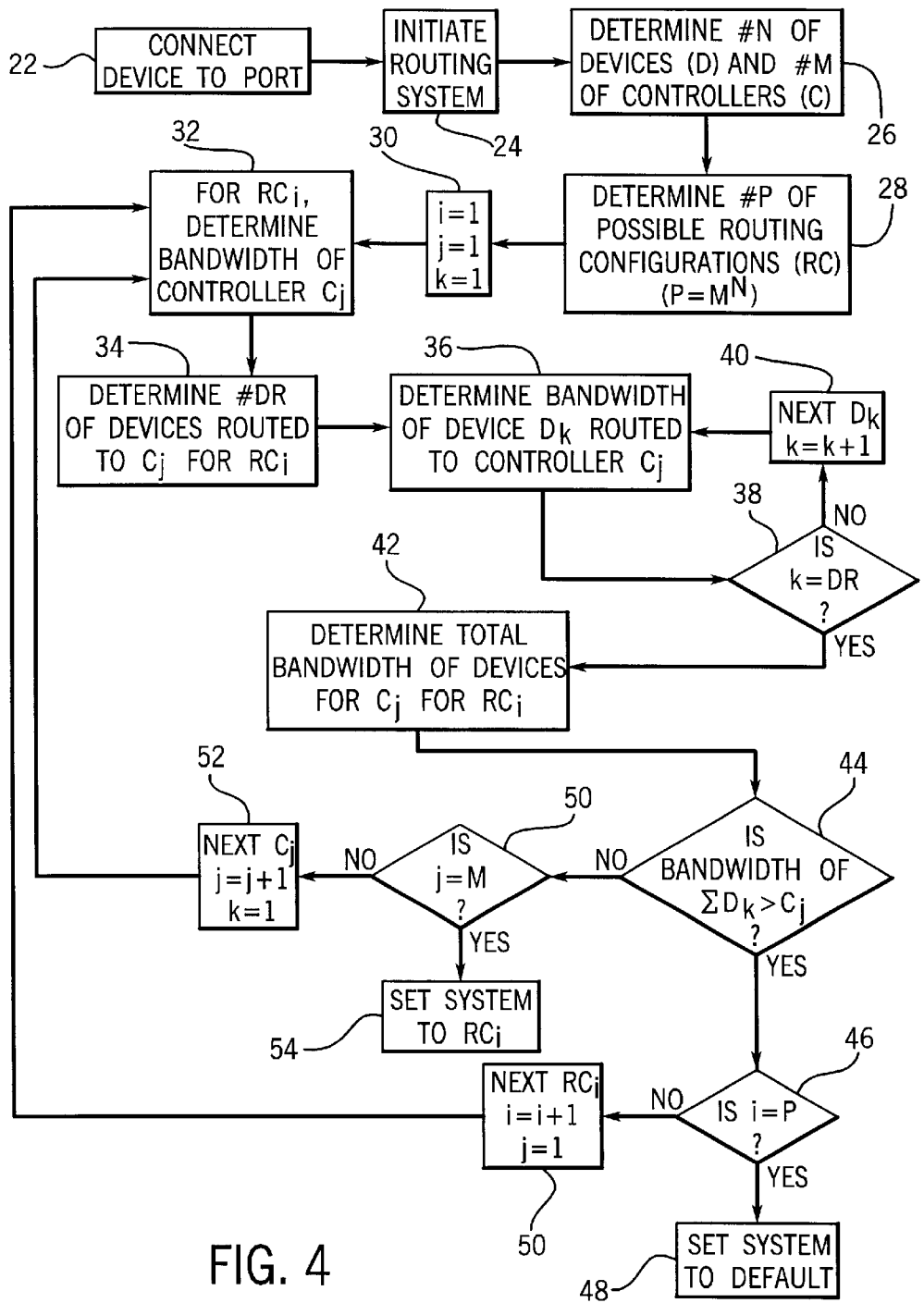
FIG. 4 is a flow chart of the present technique, illustrating operation of the device routing system.
Figure 5:
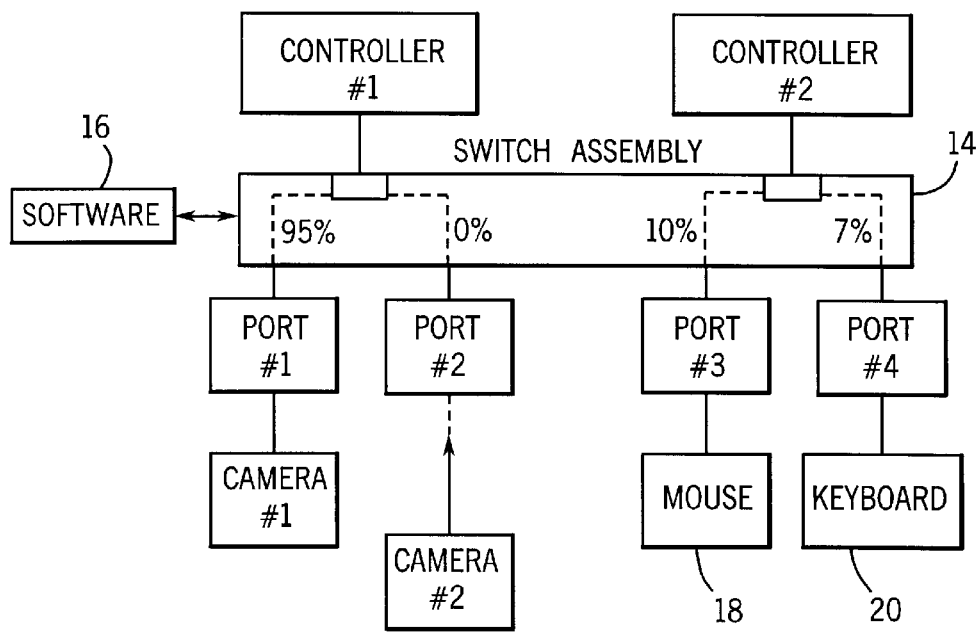
FIGS. 5 and 6 are diagrams of the controller system illustrating routing configurations before attachment of a device, and after attachment and operation of the device routing system, respectively.
Figure 6:
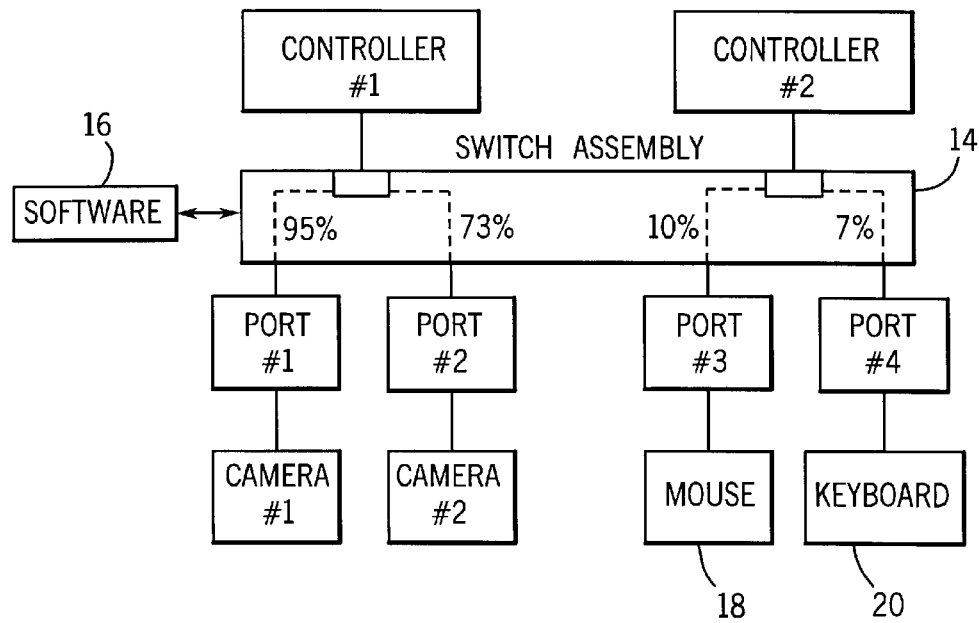

In FIG. 4 a flow chart is provided to illustrate an exemplary operation of the device routing system 12. Also, FIGS. 5 and 6 are diagrams illustrating controller system 10B before and after operation of the device routing system 12, respectively. The exemplary technique is illustrated for a system having controllers #1 and #2 and ports #1 through #4 for a camera #1, a camera #2, a mouse 18 and a keyboard 20, respectively. However, a variety of other types of devices may be connected through parts #1–#4.

As illustrated in FIG. 4, the present technique may comprise connecting a device to a port #2, such as connecting camera #2 to port #2, and then initiating the routing system (block 22, e.g., the device routing system 12). For example, in FIG. 5, the ports #1 through #4 are coupled to the switch assembly 14, which is configured such that the ports #1 and #2 are coupled to the controller #1 and the ports #3 and #4 are coupled to the controller #2. In this exemplary embodiment, the configuration illustrated in FIG. 5 is a default configuration for the device routing system 12. Note also that camera #1 is coupled to controller #1 through port #1, and requires 95% of the available bandwidth from the controller #1. For controller #2, the mouse 18 requires 10% and the keyboard 20 requires 7% of the available bandwidth. By coupling the camera #2 to port #2, this balance of required bandwidths versus available bandwidths is disturbed, requiring reconfiguration to ensure sufficient bandwidth for each of the devices. Accordingly, the present technique operates (block 24) to reconfigure the connections between the devices and the controllers.

The device routing system 12 then determines the number (N) of devices and number (M) of controllers present (block 26) in the controller system 10, and determine the number ($P=M^N$) of possible routing configurations (RC) (block 28). As mentioned above, the software 16 may detect the devices and/or the controllers, and begin a routine (block 30) for calculating the optimal configuration for the devices and controllers. For example, the software 16 can store the different possible routing configurations (RC), and then sequentially evaluate the viability of each individual configuration ($RC_I$). Accordingly, the device routing system 12 steps through each of the possible routing configurations ($RC_I$), beginning by determining the bandwidth (block 32) of controller #1 ($C_I$) for the first routing configuration ($RC_I$). The device routing system 12 may then proceed to determine the number (DR) of devices routed to the controller #1 for the first routing configuration (block 34), and start a subroutine for each of the devices ($D_K$) hypothetically routed to the controller #1.

Furthermore, the present technique determines the bandwidth (block 36) of each of the devices ($D_K$) by detecting the device bandwidth, as discussed above. The device routing system 12 then evaluates whether another device ($D_K$) is coupled to the controller (block 38), and, if so, continues to the next device (block 40) to determine the bandwidth (block 36) of that device. This process continues until all of the device bandwidths have been determined by the device routing system 12.

The technique then determines the total bandwidth (block 42) of devices hypothetically coupled to controller #1 for the first routing configuration ($RC_I$). The device routing system 12 then compares (block 44) the total bandwidth (block 42) with the controller bandwidth (block 32). If the total bandwidth (block 42) is greater than the bandwidth of controller #1, as determined above (block 32), then the device routing system compares (block 46) the number (I) of the current routing configuration ($RC_I$) with the total number (P) of routing configurations (RC). If device routing system 12 has evaluated all of the possible routing configurations, and has found no configurations which ensure that the controller bandwidths are not exceeded by the device bandwidths, then the controller system may be set to a default (block 48) (e.g., as illustrated in FIG. 5). Otherwise, the device routing system 12 may continue (block 50) to the next possible routing configuration $RC_I$, returning to the previous act of determining the bandwidth (block 32) of the controller $C_J$.

Accordingly, the present technique evaluates the number of devices routed to the controller (block 34), determines the bandwidth of each device routed to the controller (block 36), determines the total bandwidth of devices routed to the controller (block 42), and compares the total of device bandwidths versus the controller bandwidth (block 44). As described above, if the total device bandwidth exceeds the controller bandwidth, then the present technique continues to the query (block 46). Otherwise, if the total device bandwidth is less than the controller bandwidth, then the technique determines if there are additional controllers to evaluate (block 50).

If the current number (J) of the controller (CJ) being evaluated is not the last controller, then the technique continues to the next controller (block 52) and returns to the act of determining bandwidth (block 32) for evaluation of the next controller and devices hypothetically coupled to that controller. Otherwise, if the current number (J) is equal to the total number (M) of controllers for the hypothetical routing configuration being evaluated, then the present technique has successfully determined a viable configuration for the controllers and devices to ensure adequate bandwidth for each of the devices. Accordingly, the device routing system 12 may proceed to set (block 54) the controller system 10B to the routing configuration ($RC_I$) just evaluated above. This may comprise transmitting switching instructions from the software 16 to the switch assembly 14, and then configuring the controller to port/device connections via switch registers, as discussed above.

Thus, in this exemplary embodiment, the device routing system 12 sequentially evaluates possible routing configurations, and selects the first viable configuration for the devices and controllers. Alternatively, the present technique may evaluate all possible routing configurations, and select the routing configuration that provides an optimal distribution of available bandwidth from the controllers to the devices. Furthermore, the present technique may be utilized for any number of controllers, devices and/or ports, and may be applied to a variety of electronic systems having controllers and devices requiring access to those controllers. The present technique may also resolve configuration problems with controller systems 10B that do not have sufficient bandwidth in any controller-port/device configuration. For example, the device routing system 12 may determine the available bandwidths of the controllers #1 and #2, determine the desired device bandwidths of devices #1 through #4, determine ratios of the desired device bandwidths to the total available bandwidths, and then distribution the total available bandwidths to the devices #1 through #4 accordingly.

While the invention may be susceptible to various modifications and alternative forms, specific embodiments have been shown by way of example in the drawings and have been described in detail herein. However, it should be understood that the invention is not intended to be limited to the particular forms disclosed. For example, the present technique may be applied to a variety of electronic systems having multiple device controllers for a plurality of devices. The technique also may be utilized in a variety of system architectures, and for a variety of resource allocations other than data transfer characteristics of the devices and controllers. Accordingly, the invention is intended to cover all modifications, equivalents, and alternatives falling within the spirit and scope of the invention as defined by the following appended claims.

What is claimed is:

1. A system for routing a device to a controller for a computer, the system comprising:
a switch assembly comprising first and second positions for coupling a device to one of first and second controllers having first and second available bandwidths, respectively;
an analyzer configured for determining a device bandwidth for the device and for achieving a bandwidth evaluation of the device bandwidth versus the first and second available bandwidths; and
a router configured for activating and positioning the switch assembly at one of the first and second positions based on the bandwidth evaluation.

2. The system of claim 1, comprising a binary switch register for switching between the first and second positions.

3. The system of claim 1, comprising a plurality of the devices.

4. The system of claim 1, comprising a local bus for connecting the device to the computer.

5. The system of claim 1, comprising an external bus for connecting the device to the computer.

6. The system of claim 1, comprising a universal serial bus (USB).

7. The system of claim 1, comprising software configured for analyzing the device and the first and second controllers.

8. The system of claim 3, wherein at least one of the plurality of devices is a high speed device requiring a substantial amount of device bandwidth.

9. The system of claim 3, comprising a plurality of ports for the plurality of devices.

10. The system of claim 7, wherein the software is at least partially disposed in a device driver.

11. The system of claim 7, wherein the software is at least partially disposed in ROM BIOS.

12. The system of claim 7, wherein the software comprises a detection routine for detecting the device and for determining the device bandwidth.

13. The system of claim 7, wherein the software comprises an analysis routine for evaluating viability of a plurality of device-controller configurations.

14. The system of claim 9, wherein the plurality of ports comprises an infrared port.

15. The system of claim 13, wherein the analysis routine is configured for evaluating all possible device-controller configurations, and for determining an optimal configuration based on the device bandwidth and the first and second available bandwidths.

16. A system for routing a device to a controller, the system comprising an electronic device having a switchable routing assembly configured for automatically routing each of a plurality of devices to one of a plurality of controllers, wherein the switchable routing assembly is configured to distribute available data transfer capabilities for each of the plurality of controllers to the plurality of devices based on a desired data transfer statistic for each of the plurality of devices.

17. The system of claim 16, wherein the available data transfer capabilities and the desired data transfer statistics comprise bandwidths for data transfer.

18. The system of claim 16, wherein at least one of the plurality of devices is a high speed device having a substantially demanding desired data transfer statistic.

19. The system of claim 16, comprising a plurality of ports for the plurality of devices.

20. The system of claim 16, comprising a local bus for connecting the devices to the computer.

21. The system of claim 16, comprising an external bus for connecting the devices to the computer.

22. The system of claim 16, comprising a universal serial bus (USB).

23. The system of claim 16, comprising software configured for analyzing the plurality of devices and controllers.

24. The system of claim 23, wherein the software is at least partially disposed in a device driver.

25. The system of claim 23, wherein the software is at least partially disposed in ROM BIOS.

26. The system of claim 23, wherein the software comprises a detection routine for detecting the devices and for determining the desired data transfer statistics.

27. The system of claim 23, wherein the software comprises an analysis routine for evaluating viability of a plurality of device-controller configurations.

28. The system of claim 27, wherein the analysis routine is configured for evaluating all possible device-controller configurations, and for determining an optimal configuration based on the desired data transfer statistic and the available data transfer capabilities.

29. A method for automatically routing a device to a controller, comprising:
determining a desired bandwidth for a device;
determining available bandwidths for a plurality of controllers;
comparing the desired bandwidth with the available bandwidths;
selecting one of the controllers for the device based on the comparison of the desired and available bandwidths; and
automatically routing the device to the selected one of the controllers.

30. The method of claim 29, comprising coupling a switch assembly to the plurality of controllers for switchably routing the device to one of the plurality of controllers.

31. The method of claim 29, comprising automatically detecting the device and determining the desired bandwidth.

32. The method of claim 29, comprising determining all possible device-controller configurations, evaluating a plurality of the possible device-controller configurations, and selecting one of the possible device-controller configurations that provides the desired bandwidth to the device.

33. The method of claim 29, comprising coupling a port to at least one of the plurality of controllers.

34. The method of claim 29, comprising deploying the plurality of controllers in a computer.

35. The method of claim 30, comprising providing a device routing program configured for activating the switch assembly.

36. The method of claim 32, comprising evaluating all possible device-controller configurations, and selecting an optimal device-controller configuration based on the comparison of the desired and available bandwidths.

37. The method of claim 35, comprising providing a detection routine in a device driver for detecting the device.

38. The method of claim 35, comprising providing a detection routine in ROM BIOS for detecting the device.

39. The method of claim 35, comprising providing an analysis routine for evaluating viability of a plurality of hypothetical configurations each having the device coupled to one of the plurality of controllers.

40. A method for automatically configuring a plurality of devices with a plurality of controllers for a computer system, comprising:

obtaining a plurality of data transfer specifications for the plurality of devices;

determining a plurality of hypothetical configurations having each device coupled to one of the plurality of controllers;

comparing the plurality of data transfer specifications with data transfer capacities of each of the plurality of controllers for at least one of the hypothetical configurations;

selecting a viable configuration from the plurality of hypothetical configurations based on the comparison of data transfer specifications and data transfer capacities; and automatically routing each device to one controller based on the selected viable configuration.

41. The method of claim 40, comprising coupling a switch assembly to the plurality of controllers for switchably routing each of the plurality of devices to one of the plurality of controllers.

42. The method of claim 40, comprising automatically detecting and determining the data transfer specifications for the plurality of devices.

43. The method of claim 40, comprising automatically detecting a device removal, and evaluating the hypothetical configurations for the devices remaining after the device removal.

44. The method of claim 40, comprising determining and evaluating all possible hypothetical configurations, and selecting the viable configuration most optimally utilizing the data transfer capacities to serve the plurality of devices.

45. The method of claim 40, comprising coupling a port to at least one of the plurality of controllers.

46. The method of claim 40, comprising coupling a universal serial bus (USB) port to at least one of the plurality of controllers.

47. The method of claim 41, comprising providing a device routing program configured for activating the switch assembly.

48. The method of claim 47, comprising disposing at least a portion of the device routing program in ROM BIOS.

49. The method of claim 47, comprising providing an analysis routine for evaluating the plurality of hypothetical configurations.

* * * * *